United States Patent [19]

Dodd

[11] Patent Number: 4,545,608

[45] Date of Patent: Oct. 8, 1985

[54] APPARATUS FOR FACILITATING THE MOVEMENT OF A PLURALITY OF CONTAINERS

[75] Inventor: John R. Dodd, Warminster, Pa.

[73] Assignee: Henry Mann, Inc., Huntington Valley, Pa.

[21] Appl. No.: 530,299

[22] Filed: Sep. 8, 1983

[51] Int. Cl.⁴ .............................................. B66C 1/44
[52] U.S. Cl. ...................................... 294/87.1
[58] Field of Search ................... 294/87 R, 62, 87 A, 294/87.2, 87.22, 87.24, 106, 67 B, 67 BC, 113, 117, 118, 119, 16; 414/416

[56] References Cited

U.S. PATENT DOCUMENTS

| | | | |
|---|---|---|---|
| D. 30,087 | 1/1899 | Kremer | D44/15 |
| D. 57,719 | 4/1921 | Pfeiffer | D44/15 |
| D. 112,179 | 11/1938 | Reinecke | D44/15 |
| D. 160,121 | 9/1950 | Pokras | D44/15 |
| D. 210,476 | 3/1968 | Gulotta | D44/9 |
| D. 214,749 | 7/1969 | Ferrara | D44/15 |
| D. 221,169 | 7/1971 | Benes | D36/2 |
| D. 242,200 | 11/1976 | Ashton | D7/6 |
| D. 256,310 | 8/1980 | Daenen | D7/2 |
| D. 259,909 | 7/1981 | Cookson | D7/20 |
| D. 280,661 | 7/1883 | Pech | D44/15 |
| 418,090 | 12/1889 | Thompson | 220/97 C |
| 1,223,948 | 4/1917 | Finney | 294/87 A |
| 1,249,723 | 12/1917 | Danielson | 294/62 |
| 2,349,531 | 5/1944 | Weir | 294/87 |
| 2,361,463 | 10/1944 | Dorton | 294/31 |
| 2,365,930 | 12/1944 | Bayhi | 294/87 |
| 2,441,616 | 5/1948 | Burke | 179/90 |
| 2,553,880 | 5/1951 | Stigler | 294/172 |
| 2,666,665 | 1/1954 | Whitcher | 294/87 A |
| 2,733,746 | 2/1956 | Rauner | 146/3 |
| 2,749,010 | 6/1956 | Amberg | 229/1.5 |
| 2,792,253 | 5/1957 | Bliss | 294/87 A |
| 2,816,793 | 12/1957 | Elberty | 294/106 |
| 2,863,579 | 12/1958 | Meyer | 294/87 |
| 2,948,564 | 8/1960 | Carkhuff | 294/87 A |
| 2,998,174 | 8/1961 | Weder | 294/159 |
| 3,057,651 | 10/1962 | Lloyd | 294/62 |
| 3,078,020 | 2/1963 | Boonstra | 224/45 |
| 3,115,281 | 12/1963 | Somme | 222/184 |
| 3,150,811 | 9/1964 | Amberg | 229/5.5 |
| 3,158,275 | 11/1964 | Hart | 294/90 |
| 3,190,484 | 6/1965 | Mount | 220/23.83 |
| 3,203,611 | 8/1965 | Anderson | 229/1.5 |
| 3,264,027 | 8/1966 | Luther | 294/16 |
| 3,287,057 | 11/1966 | Gallapoo | 294/81 |
| 3,298,541 | 1/1967 | Alexon | 214/1 |
| 3,363,820 | 1/1968 | Schilling | 229/1.5 |
| 3,784,052 | 1/1974 | Edwards | 220/970 |
| 3,861,733 | 1/1975 | Vander Mey | 294/33 |
| 4,109,952 | 8/1978 | Monzain | 294/16 |
| 4,193,494 | 3/1980 | Green | 206/217 |

*Primary Examiner*—James B. Marbert
*Attorney, Agent, or Firm*—Panitch Schwarze Jacobs & Nadel

[57] ABSTRACT

An apparatus for facilitating the movement of at least one container and preferably a plurality of containers is comprised of a base member having a plurality of gripping elements mounted thereon. Biasing means are provided for biasing the gripping elements to engage and hold the container or containers to be moved. Actuator means are provided for engaging and moving the gripping elements against the biased of the biasing means to disengage the gripping elements from the container or containers. The apparatus may also include alignment means mounted on the base member for aligning the container or containers with respect to the gripping elements.

1 Claim, 3 Drawing Figures

APPARATUS FOR FACILITATING THE MOVEMENT OF A PLURALITY OF CONTAINERS

BACKGROUND OF THE INVENTION

The present invention relates generally to an apparatus for facilitating the movement of a plurality of containers and, more particularly, to such an apparatus for use in connection with moving a plurality of containers holding electronic components to be attached to a printed circuit board at an automated electronic component assembly station.

The growth in the electronics industry has required that automated assembly stations be developed to facilitate the efficient assembly of electronic components to printed circuit boards. Automated systems have been developed which hold a printed circuit board and deliver specific components to an operator for installation at a specifically identified location on the printed circuit board. Typically, the electronic components are held in specially designed containers or cups which are delivered to the operator at predetermined times by a computer controlled drive mechanism. It is necessary to "fill" the cups by placing the electronic components into the cups prior to the cups being installed within the drive mechanism. The cups are filled at a location remote from the assembly station so that the assembling of the printed circuit boards is not interrupted. Periodically, the operation at the station is stopped to permit removal of depleted cups and replacement with filled cups.

The present invention comprises an apparatus for facilitating the movement and placement of a plurality of the component cups to minimize the down time at the printed circuit board assembly station.

SUMMARY OF THE INVENTION

Briefly stated, the present invention comprises an apparatus for facilitating the rapid and efficient movement of at least one container comprising a base member; a plurality of gripping elements mounted upon the base member; biasing means for biasing the gripping elements into engagement with the container; and actuator means for moving the gripping elements against the bias of the biasing means to disengage the gripping elements from the container. In one embodiment, the apparatus is employed for the movement of a plurality of cylindrical, open-topped containers carrying electronic components.

BRIEF DESCRIPTION OF THE DRAWINGS

The foregoing summary, as well as the following detailed description will be better understood when read in conjunction with the appended drawings. For the purpose of illustrating the invention, there is shown in the drawings an embodiment which is presently preferred, it being understood, however, that this invention is not limited to the precise arrangement and instrumental shown. In the drawings.

DESCRIPTION OF A PREFERRED EMBODIMENT

Figure 1:
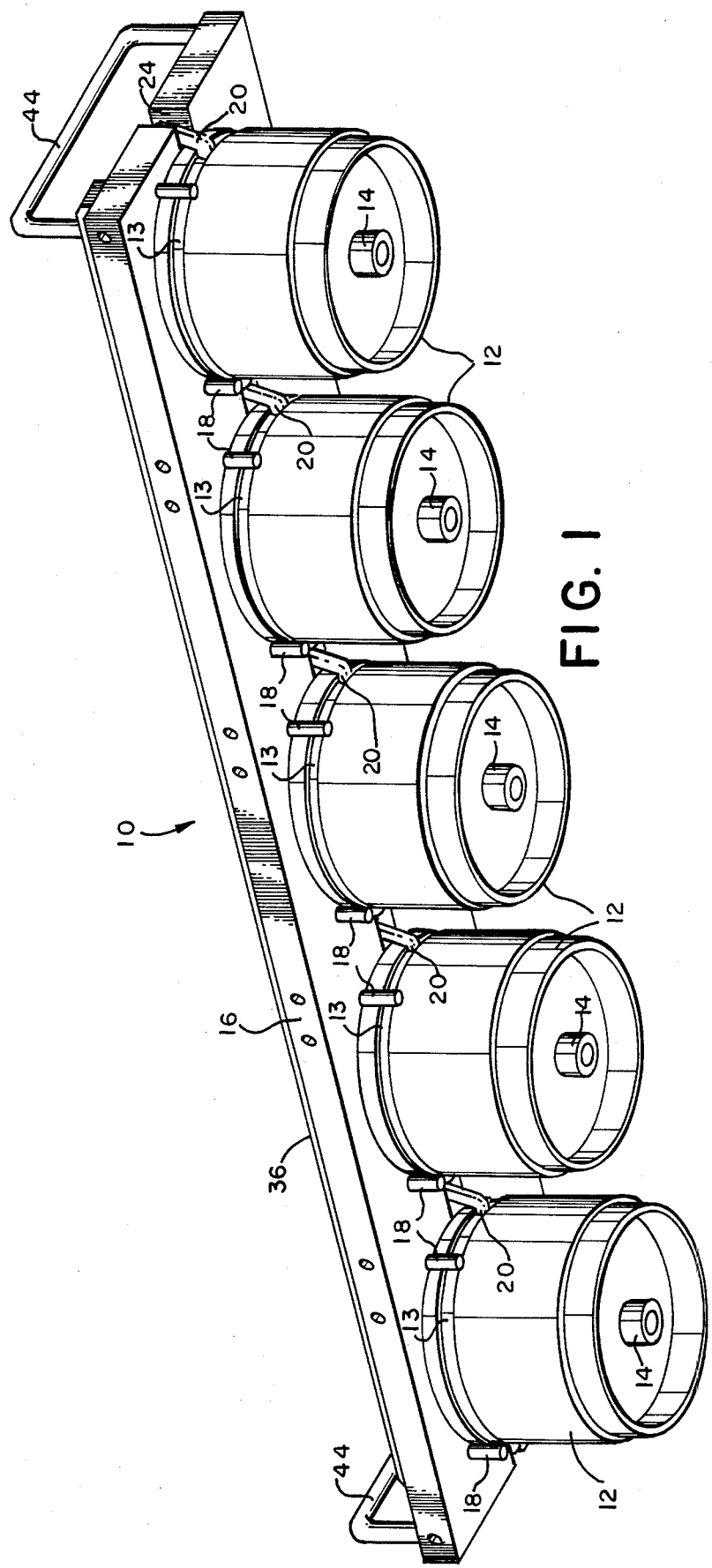
FIG. 1 is a bottom perspective view of a container moving apparatus in accordance with the present invention.

Referring to the drawings, in detail, wherein like numerals indicate like elements throughout, there is shown in FIG. 1 a perspective view of a container moving apparatus 10 in accordance with the present invention. In the present embodiment, the container moving apparatus 10 is employed to move a plurality of generally cylindrical, open-topped containers or cups 12 which are employed to hold various objections, such as electrical and/or electronic components (not shown).

Figure 2:
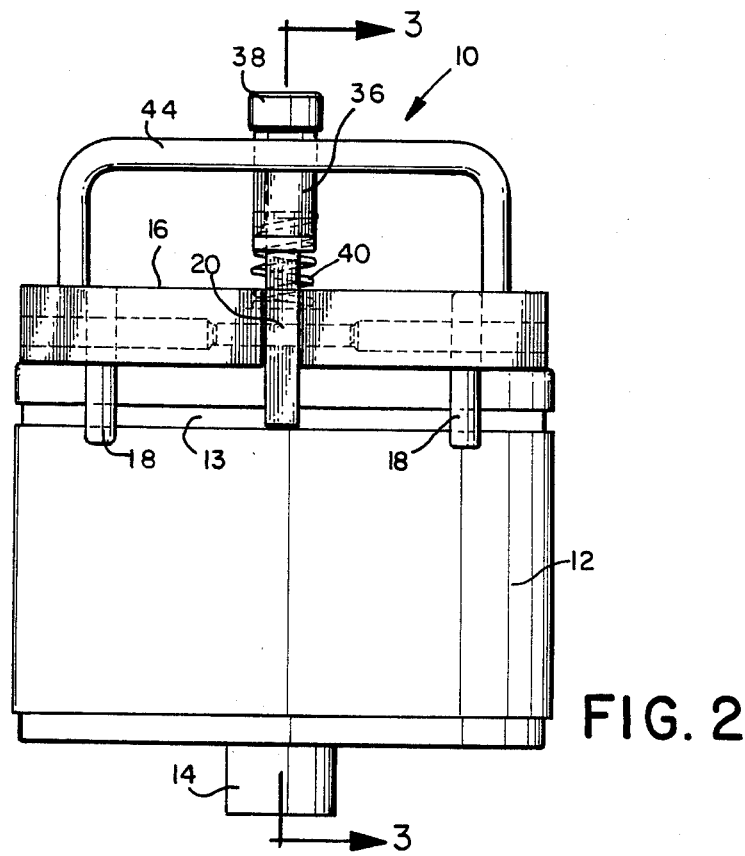
FIG. 2 is a slightly enlarged end elevation view of the container moving apparatus of FIG. 1.

Although other uses will be readily apparent to those skilled in the art, the cups 12 of the present embodiment are specially designed to be used in connection with an automated printed circuit board assembly station (not shown) in which individual cups holding specific components are delivered to an assembler at predetermined specific times for installation in specifically identified positions on a printed circuit board. For this purpose, the cups 12 each include means to cooperate with a drive mechanism (not shown) associated with the automated printed circuit board assembly station to facilitate the movement of the component cups 12, for example, a downwardly extending generally centrally positioned cylindrical lug 14. For reasons which will hereinafter become apparent, each of the cups 12 has an annular groove 13 (best seen in FIG. 2), extending around its outer surface proximate to the top. It should be understood that, although the cups 12 as shown in the present embodiment are generally cylindrical, the present invention is not limited to cups or containers having the same size, shape or configuration as those shown.

The container moving apparatus 10 of the present invention comprises an elongated base member 16 comprised of metal, plastic or any other suitable generally rigid material. In the illustrated present embodiment, a container moving apparatus 10 is employed for the convenient movement of five cups 12 arranged in a row and, therefore, the base member 16 is rectangular in plan. The base member 16 is slightly longer than the combined diameters of the five cups and has a width which is slightly greater than the diameter of one of the cups 12. In this manner, the base member 16 serves to close or cover each of the open-topped cups 12 as they are being transported, thereby preventing the contents from spilling out of the cups and also preventing any foreign material from getting into the cups while they are being transported. It should be understood that the base member 16 may be fabricated from any other suitable material such as wood or polymeric plastic and may be any other size or shape suitable to accommodate a desired quantity or arrangement of cups or containers. Polymeric material, such as PVC, is the presently preferred material for the base member 16.

The base member 16 includes alignment means, in the present embodiment a plurality of generally cylindrical pegs 18, extending downwardly from the underside of the base member 16 for aligning the cups 12 with respect to the base member 16. In the present embodiment, the pegs 18 are arranged in groups of four individual pegs 18, the pegs in each group being spaced from each other and positioned on the base member 16 so that a single container 12 fits snugly within the pegs 18 of each group as shown in FIG. 1. It should be understood that, while cylindrical alignment pegs 18 are employed in connection with the present embodiment, any other suitable type of alignment means could be employed, such as annular grooves (not shown) within the bottom surface of the base member.

Figure 3:
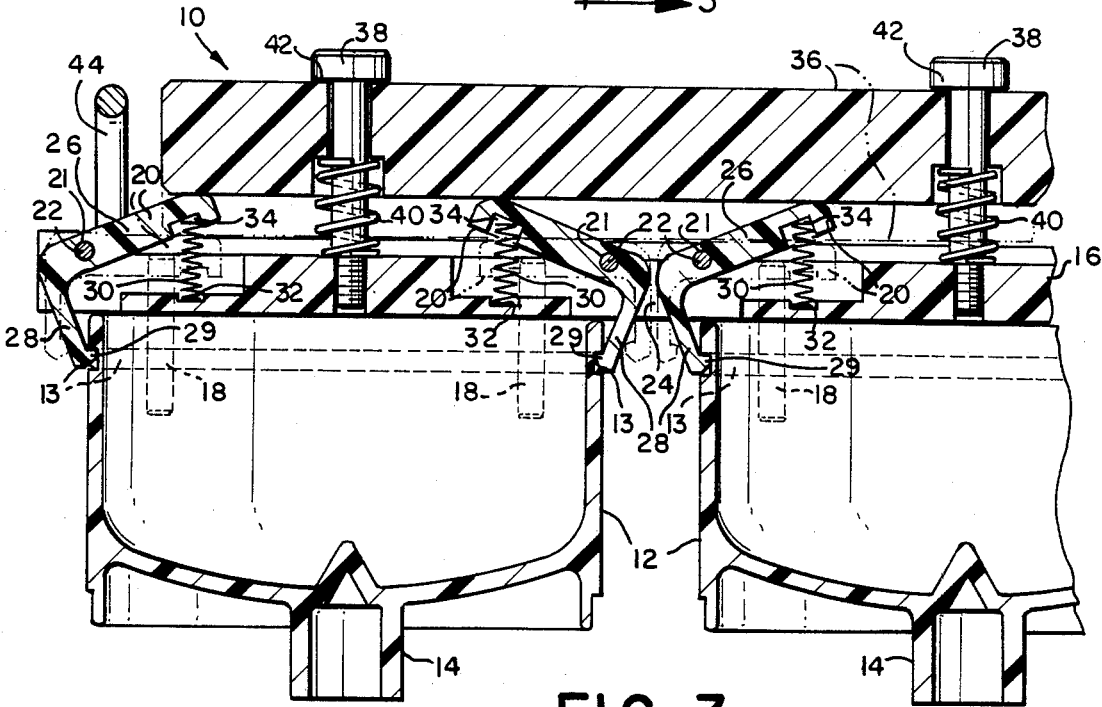
FIG. 3 is a sectional view of the container moving apparatus taken along line 3—3 of FIG. 2.

A plurality of gripping elements 20 are provided to engage and hold the cups 12 against the undersurface of the base member 16 as shown in FIG. 1. As best illustrated in FIG. 3, each gripping element 20 is pivotally mounted upon a generally cylindrical pivot pin 22 which bridges generally centrally positioned slots 24 extending through the base member 16. In the present embodiment, the gripping elements 20 have two leg portions 26 and 28 at approximately a 90 degree angle with respect to each other. The gripping elements of the presently preferred embodiment preferably are made of one piece polymeric material and are generally L-shaped in cross section. The pivot pins 22 extend through suitably sized openings 21 positioned on the elongated leg 26 of the L-shaped gripping element at a point slightly beyond the point where the leg portion 26 is joined to the shorter leg portion 28 of the gripping element.

As shown in FIG. 3 of the presently preferred embodiment, two gripping elements 20 are employed to engage and hold each cup 12. The two gripping elements 20 for each cup 12 are suitably spaced apart and mounted to the base member 16 with opposite orientations so that the two gripping elements 20 pivot in opposite directions for gripping opposing portions of the cup 12 as shown.

Biasing means are employed for biasing the gripping elements 20 into engagement with the cups 12 to grip and hold the cups during movement of the apparatus 10. In the present embodiment, the biasing means comprises a plurality of coil springs 30, one such coil spring for each of the gripping elements 20. One end of each coil spring 30 is disposed within a suitably sized generally cylindrical notch or seat 32 with the base member 16. The other end of each spring 30 is disposed within a complementary generally cylindrical seat 34 along the leg portion 26 of each gripping element 20. The coil springs 30 are under compression to urge the gripping element leg portions 26 to move upwardly (as shown on FIG. 3) with respect to the base member 16 and inwardly with respect to the cups 12. A lip 29 is formed at the distal end of each gripping element leg portion 28 and extends from the leg portion toward the center of its associated cup 12. The upward urging of the gripping element leg portion 26 causes the gripping elements 20 to pivot about the pivot pins 22 thereby resulting in lips 29 at the ends of gripping element leg portions 28 engaging the cups. The lips 29 extend into the annular cup grooves 13 to firmly support and hold the cups against the undersurface of the base member 16 so that the items within the cups cannot spill from the cups during movement.

An actuator means is provided for pivoting the gripping elements 20 against the bias of the springs 30 to disengage the gripping elements from the cups 12. In the presently preferred embodiment, the actuator means comprises an elongated actuator member 16 which causes all of the gripping elements 20 to pivot simultaneously. The actuator member 36 is attached to the base member 16 by a plurality of captive screws 38 (only two of which are shown in FIG. 3). Preferably, one captive screw 38 is associated with and is generally aligned with the central portion of each cup 12. Compression coil springs 40, each surrounding a portion of each captive screw 38, urge the actuator member 36 upwardly, away from the base member 16 and into engagement with the heads 42 of the captive screws 38 as shown in FIG. 3.

When the actuator member 36 is in the position shown in FIG. 3, the gripping elements 20 are pivoted by the urging of the springs 30 to engage and hold the cups 12 as shown. Under the urging of the springs 30, the distal ends of the gripping element leg portions 26 engage the underside of the actuator member 36 as shown. When it is desired to release the cups 12, the actuator member 36 is moved downwardly against the bias of the coil springs 40, toward the base member 16 (to the position as shown in phantom in FIG. 3). The downward movement of the actuator member 36 causes the gripping elements 20 to pivot against the bias of coil springs 30 (also as shown in phantom in FIG. 3). In this manner, the gripping elements 20 are disengaged from the cups 12 and the cups are released.

A pair of handles 44 are provided proximate the ends of the base member 16 to permit the container moving apparatus 10 to be conveniently picked up by an operator. The handles 44 may be made of any convenient material and may be oriented in any convenient way with respect to the base member 16. In the presently preferred embodiment, the handles 44 have an inverted U-shape and are attached by screws or other suitable fasteners (not shown) to the upper surface of the base member 16 adjacent its ends. The operator may conveniently hold the container moving apparatus by grasping one handle 44 with each hand, the thumbs of each hand being employed to depress the actuator member 36 toward the base member 16 for releasing the cups 12.

In the operation of the container moving apparatus 10, a row of, for example, five empty cups 12 are initially positioned within a specially designed tray or other such supporting apparatus (not shown) and the various items, such as electrical or electronic components are placed in the individual cups. Thereafter, the container moving apparatus 10 is positioned above the row of cups which are ready to be moved to the assembly station. Prior to picking up the five cups, the actuator member 36 is depressed or moved toward the base member 16, thereby pivoting the gripping elements 20 to the positions as shown in phantom in FIG. 3. The container moving apparatus is then lowered into substantially simultaneous engagement with all of the cups, the alignment pegs 18 insuring that the cups 12 are properly aligned with respect to the base member 16. The tray which initially holds the cups also initially aligns and spaces the cups relative to each other. Thus, when the container moving apparatus is lowered onto the cups 12, the cups fit precisely between the aligning pegs 18 as shown in FIG. 1.

Once the cups 12 are properly abutted against the underside of the base member 16, the operator releases the actuator member 36 and allows it to move upwardly, away from the base member 16, under the urging of the coil springs 40. As the actuator member 36 moves upwardly, the gripping elements 20 pivot under the urging of coil springs 30 and engage the five cups 12. The lips 29 on each of the gripping elements base portions 28 extend into the annular grooves 13 of the cups to provide a firms basis for supporting the cups 12.

Once the gripping elements 20 have engaged the cups 12, the container moving apparatus 10 may be lifted and conveniently carried to the automated printed circuit board assembly station (not shown). Thereafter, the cups 12 may be lowered into the drive mechanism on the assembly station (not shown). The cups 12 may then be released from the container moving apparatus 10 by again depressing the actuator member 36 against the urging of coils springs 40 to thereby pivot the gripping elements 20 to the position as shown in phantom in FIG. 3. The container moving apparatus 10 may then be lifted upwardly without affecting the position and alignment of the cups 12. The container moving apparatus 10 may also be utilized to pick up and remove empty cups from the assembly station for refilling.

From the foregoing description, it can be seen that the present invention comprises an apparatus for facilitating the movement of a plurality of containers. It will be recognized by those skilled in the art that changes may be made to the above-described embodiment of the invention without departing from the broad inventive concepts thereof. It is understood, therefore, that this invention is not limited to the particular embodiment disclosed, but it is intended to cover all modifications which are within the scope and spirit of the invention as defined by the appended claims.

I claim:

1. An apparatus for facilitating the movement of a plurality of open-topped containers and for depositing the containers in a predetermined aligned spaced relationship comprising:

an elongated generally rigid base member generally rectangular in cross section, the base member being at least slightly wider than the container width and being at least slightly longer than the combined lengths of the containers;

a plurality of gripping elements pivotally mounted upon the base member, the gripping elements being generally L-shaped in cross section, two gripping elements being employed to engage a single container;

biasing means for biasing the gripping elements into engagement with the containers and to cause the tops of the containers to firmly engage the base member whereby the containers are covered by the base member to prevent the contents of the containers from spilling during movement;

actuator means for simultaneously moving the gripping elements against the bias of the biasing means to disengage the gripping elements from the containers; and alignment means comprising a plurality of pegs extending from the base member the pegs being arranged in groups with the pegs in each group being spaced from each other and being positioned so as to snugly engage a single container for aligning the containers with respect to the gripping elements.

* * * * *